(12) United States Patent
Graff et al.

(10) Patent No.: US 9,688,055 B2
(45) Date of Patent: Jun. 27, 2017

(54) ABSORBENT COMPOSITE SHEET, ROLL OF SUCH A SHEET, PACKET OF SHEETS, AND MANUFACTURING PROCESS

(75) Inventors: Pierre Graff, Wolfgantzen (FR); Nicolas Pommier, Balgau (FR); Pierre Probst, Ammerschwihr (FR); Gregory M. Fike, Atlanta, GA (US)

(73) Assignee: SA TISSUE FRANCE, Saint-Ouen (FR)

( * ) Notice: Subject to any disclaimer, the term of this patent is extended or adjusted under 35 U.S.C. 154(b) by 1622 days.

(21) Appl. No.: 12/688,976

(22) Filed: Jan. 18, 2010

(65) Prior Publication Data

US 2010/0151174 A1  Jun. 17, 2010

Related U.S. Application Data

(63) Continuation-in-part of application No. PCT/FR2008/001034, filed on Jul. 16, 2008.

(30) Foreign Application Priority Data

Jul. 19, 2007 (FR) ..................................... 07 56600

(51) Int. Cl.
*B32B 15/12* (2006.01)
*B32B 29/06* (2006.01)
(Continued)

(52) U.S. Cl.
CPC ............... *B32B 15/12* (2013.01); *B32B 7/12* (2013.01); *B32B 15/20* (2013.01); *B32B 37/20* (2013.01); *D21H 27/32* (2013.01); *B32B 37/1284* (2013.01); *B32B 38/06* (2013.01); *B32B 2309/105* (2013.01); *B32B 2311/24* (2013.01); *B32B 2317/12* (2013.01); *B32B 2439/00* (2013.01); *D21H 19/02* (2013.01);
(Continued)

(58) Field of Classification Search
USPC ........................... 428/43, 337, 215, 219, 121
See application file for complete search history.

(56) References Cited

U.S. PATENT DOCUMENTS 2,441,477 A   5/1948   Farrell
2,778,760 A   1/1957   Hurst
(Continued)

FOREIGN PATENT DOCUMENTS

DE    371289 C       3/1923
EP    325067 A1  *   7/1989
(Continued)

OTHER PUBLICATIONS

Machine_english_translation_JP_05305693_A; Fujie; Embossed Decorative Sheet using Metal Foil; JPO; whole document.*

(Continued)

*Primary Examiner* — Tahseen N Khan
(74) *Attorney, Agent, or Firm* — Drinker Biddle & Reath LLP

(57) ABSTRACT

An absorbent composite sheet for domestic use includes a first ply of paper, with a degree of absorption of liquids equal to or greater than around 5 (g/g CEN standard), and a second superposed ply composed of a metal-containing layer, the thickness of the second ply being equal to or less than around 10 microns (μm).

20 Claims, 5 Drawing Sheets

(51) Int. Cl.
  *B32B 37/00* (2006.01)
  *B32B 15/20* (2006.01)
  *B32B 37/12* (2006.01)
  *B32B 37/10* (2006.01)
  *B32B 37/20* (2006.01)
  *D21H 27/32* (2006.01)
  *B32B 7/12* (2006.01)
  B32B 38/06 (2006.01)
  D21H 19/02 (2006.01)
  D21H 27/00 (2006.01)
  D21H 27/02 (2006.01)

(52) U.S. Cl.
  CPC ........... *D21H 27/002* (2013.01); *D21H 27/02* (2013.01); *Y10T 156/10* (2015.01); *Y10T 428/15* (2015.01); *Y10T 428/2419* (2015.01); *Y10T 428/24967* (2015.01); *Y10T 428/266* (2015.01)

(56) References Cited

U.S. PATENT DOCUMENTS

| | | | |
|---|---|---|---|
| 2,976,170 A | | 3/1961 | Eiland |
| 3,553,074 A | | 1/1971 | Knepp |
| 3,865,664 A | * | 2/1975 | Neumann ................. 156/192 |
| 4,082,594 A | * | 4/1978 | Stonehouse ............... 156/253 |
| 5,944,706 A | * | 8/1999 | Palumbo et al. ........... 604/368 |
| 2007/0232178 A1 | * | 10/2007 | Polat et al. ................ 442/414 |
| 2008/0125734 A1 | * | 5/2008 | Muthiah et al. ............ 604/367 |

FOREIGN PATENT DOCUMENTS

| | | | |
|---|---|---|---|
| EP | 0480907 | A1 | 4/1992 |
| FR | 937666 | A | 8/1948 |
| FR | 937666 | A1 | 8/1948 |
| FR | 2624697 | A1 | 6/1989 |
| GB | 20542 | A | 0/1905 |
| GB | 20542 | A1 | 0/1905 |
| GB | 305515 | A | 2/1929 |
| GB | 305515 | A1 | 2/1929 |
| GB | 635268 | A * | 4/1950 |
| GB | 1103688 | A * | 2/1968 |
| GB | 1103688 | A1 | 2/1968 |
| JP | 05305693 | A * | 11/1993 |
| JP | 5305693 | A | 11/1993 |
| JP | 05305693 | A1 | 11/1993 |

OTHER PUBLICATIONS

English Abstract for FR2624697; Publication date: Jun. 23, 1989; 1 pg.
English Abstract for corresponding document: GB 635268(A); Abstract not available for FR93766; Publication date: Aug. 24, 1948; 1 pg.
English Abstract for EP0480907; Publication date: Apr. 15, 1992; 1 pg.
English Abstract for JP5305693; Publication date: Nov. 19, 1993; 1 pg.
PCT International Search Report for International Application No. PCT/FR2008/001034; International Filing date: Jul. 16, 2008; International Publication No. WO 2009/030825 A3; International Publication date: Mar. 12, 2009; 7 pgs.
International Search Report dated Mar. 26, 2009 for PCT/FR2008/001034 (published May 14, 2009).
Written Opinion of the International Searching Authority for PCT/FR2008/001034.
English translation of the Written Opinion of the International Searching Authority for PCT/FR2008/001034.
International Preliminary Report on Patentability Chapter I for PCT/FR2008/001034.
English translation of the International Preliminary Report on Patentability Chapter I for PCT/FR2008/001034.
"Der Papiermacher, Echt Pergarnent," Fachblatt der Deutschen Papierindustrie, May 12, 1989, p. 68, col. 2, chapter"2. Definitionen,".
"Properties of Paper: An Introduction," William E. Scott, Tappi Press, 1989, p. 155, col. 1, ¶ 6, last sentence.

* cited by examiner

ABSORBENT COMPOSITE SHEET, ROLL OF SUCH A SHEET, PACKET OF SHEETS, AND MANUFACTURING PROCESS

CROSS REFERENCE TO RELATED APPLICATIONS

This application is a continuation-in-part application of PCT Application No. PCT/FR2008/001034 filed Jul. 16, 2008, which claims priority to French Application No. FR 07 56600, filed Jul. 19, 2007, the contents of both are hereby incorporated by reference in their entirety.

BACKGROUND OF THE INVENTION

The present disclosure relates to a so-called composite sheet for domestic or away from home use.

Numerous examples are known of so-called "multi-ply" sheets, also known as sheets of tissue paper, having at least two separate plies of which at least one is an absorbent ply, especially made of cellulose wadding.

The so-called "tissue" paper in accordance with an embodiment of the invention is defined in the standard NF EN ISO 12625-1.

Multi-ply sheets are very commonly used and are in particular available packaged as rolls of pre-cut sheets, especially in the form of rolls for wiping known as "kitchen towel paper" or else as "kitchen towel" rolls.

These products are much appreciated for their various parameters such as their flexibility, their softness, their strength in the dry and wet state, their liquid absorption capacity, etc.

While composite sheets having the main characteristics and qualities mentioned above may be suitable for their intended purpose, improvements in the art may be realized by providing a novel product of the composite sheet type which, while having the main characteristics and qualities mentioned above, makes it possible, in addition, to package hot or cold food products while effectively protecting them, especially with a view to easily producing a complete or partial packaging of the food which may then be almost impermeable to liquids and to provide a thermal barrier function, and which may in addition be folded and unfolded several times without however deteriorating.

BRIEF DESCRIPTION OF THE INVENTION

An embodiment of the invention provides a composite sheet for domestic or away from home use, the composite sheet including:

a first ply of paper with a degree of absorption of liquids equal to or greater than around 5 (g/g CEN standard), a second superposed ply which is composed of a metal-containing layer, the thickness of which is equal to or less than around 10 μm (microns).

In an embodiment, the second ply is a metal foil, and the second ply is joined to the first ply by an adhesive.

Such an example product essentially has the advantages of being able to be smoothed out and therefore reused, which is not the case for a conventional aluminium foil, of which the thickness is around 11 microns to around 13 microns.

A product according to an embodiment of the invention is however stiffer than such an aluminium foil. The example composite product according to an embodiment of the invention thus keeps both its flexibility and its stiffness.

According to an embodiment of the invention, the composite sheet product is as absorbent as a multi-ply tissue sheet, but it is stronger.

Such a product may, in addition, be packaged in the form of a roll of pre-cut or non-pre-cut composite sheet, which may be used in existing dispensers for aluminium foil (also known as "aluminium paper") and/or kitchen towel that equip, in particular, numerous domestic or professional kitchens.

According to other features of an example embodiment of the invention:

the thickness of the second ply is equal to or less than around 7 microns (μm);

the basis weight (weight per unit area) of the second ply is between around 13 and around 19 grams per square meter (g/m$^2$), desirably equal to around 17 grams per square meter (g/m$^2$);

the first ply is a tissue paper sheet, an embossed tissue paper sheet, a machine gloss paper sheet a machine glaze paper sheet; or a machine finish paper sheet;

the thickness of the sheet forming the first ply is between around 0.25 and around 0.45 millimeter (mm), desirably equal to around 0.35 millimeter (mm);

the basis weight of the sheet forming the first ply is between around 17 and around 50 grams per square meter (g/m$^2$), desirably equal to around 19 grams per square meter (g/m$^2$);

the basis weight of the composite sheet is between around 30 and around 69 grams per square meter (g/m$^2$);

the adhesive is a vinyl type adhesive;

the adhesive is desirably deposited on one of the faces of the metal foil forming the second ply; and the metal-containing layer forming the second ply is an aluminium layer.

An embodiment of the invention also provides a roll composed of a composite sheet according to the invention, formed from a continuously wound strip of composite sheet.

According to one feature of the roll, the strip of composite sheet wound as a roll includes pre-cut regions.

An embodiment of the invention also provides a packet of individual sheets composed of a stack of individual composite sheets according to an embodiment of the invention, which may be stacked up, or folded and/or interfolded.

An embodiment of the invention also provides a process for manufacturing a sheet according to an embodiment of the invention, including the process of joining the first ply and the second ply by bonding and pressing between two rolls.

BRIEF DESCRIPTION OF THE FIGURES

Other features and advantages of an embodiment of the invention will appear on reading the description which follows, for an understanding of which reference will be made to the appended drawings in which.

DETAILED DESCRIPTION OF THE INVENTION

Figure 1:
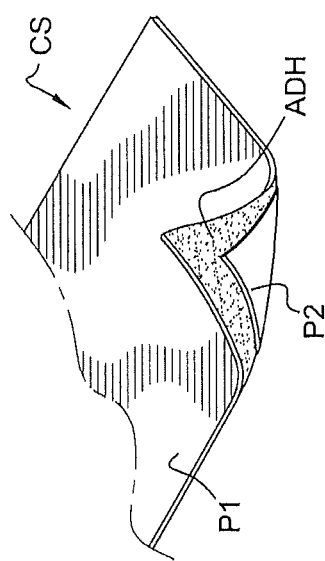
FIG. 1 is a schematic perspective view of a composite sheet according to an embodiment of the invention.

According to an embodiment of the invention, a composite sheet CS is provided which has two plies, a first ply P1 and a second ply P2, of which one, P1, is a sheet of so-called "tissue" paper made of cellulose wadding, a sheet of machine gloss or machine glaze (MG) paper, or a sheet of machine finish (MF) paper, and of which the other, P2, is a metal-containing layer, and for example a metal foil such as an aluminium foil for example, the two plies being joined together by a vinyl adhesive ADH when each ply is one sheet.

The first ply P1 is chosen with consideration to its mechanical strength and its high degree of absorption of liquids g/g: equal to or greater than around 5 (CEN standard) for example.

In an embodiment, the first ply P1 is a tissue ply produced in the wet state, and desirably a so-called TAD (Through Air Dry process) product obtained according to the known techniques described and represented, for example, in documents WO-A1-01/44568, EP-A1-631 014 or FR-A1-2 481 328.

In an embodiment, the first ply P1 made of a TAD tissue sheet is embossed in the wet state according to techniques known in the field and desirably by means of a so-called "imprinting" fabric.

Features of an example sheet forming the first ply are, for example, the following:

Basis weight: around 20 g/m² (grams per square meter).
Thickness: around 0.35 mm (millimeter).
Embossing carried out by marking by means of a fabric in the wet state.
MD (machine direction of the sheet) tensile strength: around 300 N/m (Newtons per meter).
CD (cross direction of the sheet) tensile strength: around 260 N/m.
MD (machine direction) elongation: around 20%.
CD (cross direction) elongation: around 9%.
CD (cross direction) wet strength: around 75 N/m.
Liquid absorption capacity g/g: around 15 (CEN standard).
Liquid absorption capacity g/m²: around 315 g/m².

In an embodiment, the composition of the sheet is 100% pure cellulose wadding including around 90% based on resinous paper-making fibers and around 10% based on hardwood papermaking fibers.

In accordance with an embodiment of the invention, a first ply P1 is characterized by a high flexibility, a large absorption capacity, good wet strength, and a "cloth-like" visual appearance.

In an embodiment, the first ply P1 is a machine gloss or a machine glaze (MG) paper, or a machine finish (MF) paper. These papers are smoother than the aforementioned tissue paper and provide better printing surfaces. The physical properties of the MG or MF papers are similar to those of the aforementioned tissue paper, with the exception of the elongation, which in this case is around ⅓ the value of the tissue paper, and the thickness, which would be around 10% of the value of the tissue paper. In contrast to the tissue paper, which contains 100% cellulose, the MG or MF papers could contain inorganic fillers in the range of around 1% to around 30% by weight. These fillers improve the optical properties and lower the cost of the paper.

In comparison with the aforementioned tissue paper, which is 100% cellulose wadding including around 90% based on resinous papermaking fibers and around 10% based on hardwood papermaking fibers, the MG and MF sheets can contain around 20% to around 90% resinous fibers and around 80 to around 10% hardwood fibers. In applications where the release coating is utilized, around 0.1% to around 5% by weight will be coating material with the remaining fiber sheet composed as described above.

The second ply P2 is for example an annealed aluminium foil having a small thickness and with its surface degreased, of which the main characteristics are the following:

Thickness: less than around 7 μm (microns), for example equal to around 6.0 μm (microns)±around 8%.
Basis weight: around 17 g/m².
Elongation: around 1%.

The aluminium foil forming the second ply P2 is desirably for food contact or use, and desirably conforms to the 2004/1935/EC and 89/109/EEC directives and regulations.

By comparison, an aluminium foil—conventional aluminium paper for household use, for example—has a thickness of around 11 μm (microns) to around 13 μm and, relative to such a "thick" conventional foil, the very thin foil or layer of the second ply P2 according to an embodiment of the invention, used alone would be too fragile for packaging and would withstand with great difficulty the mechanical stresses inherent to the various handlings.

And with regard to a process for manufacturing a composite sheet according to an embodiment of the invention, it is only through the teachings disclosed herein that one skilled in the art is taught to combine two plies such as plies P1 and P2, especially due to the very small thickness of the ply P2, and due to respecting the standards relating to food contact which impose restrictions to the choice of adhesive.

As disclosed herein, the combination of the two plies P1 and P2 is carried out in an embodiment of the invention by application of a specific adhesive ADH, suitable for food contact (for example an aqueous dispersion of a vinyl polymer), which in an embodiment is deposited on one face of the second ply P2. The adhesive ADH is, for example, an adhesive with the reference SUBO DA 37M sold by Bostik (trade mark). The adhesive used desirably respects the national and international regulations regarding the contact of materials with foodstuffs, and desirably conforms to the national and international standards and regulations on that subject.

The second ply P2, of which one face is coated with adhesive, is for example applied to/pressed on the first ply P1 by a pressure roll known as a marrying roll.

By way of example, the main characteristics of the composite sheet CS thus obtained in accordance with an embodiment of the invention are the following:

Basis weight: around 39 g/m².
Thickness: around 0.29 mm.
Dry strength: MD (machine direction): around 363 N/m and CD (cross direction): around 369 N/m.
Elongation: around 3%.
Liquid absorption capacity g/g: around 9 (CEN standard).

Furthermore, in an embodiment, the wet (tensile) strength of the composite sheet CS is around 279 N/m [MD (machine direction)] and around 294 N/m [CD (cross direction)]. The wet strength/dry strength ratio is between around 0.77 and around 0.80.

The invention is not limited to the design of the second ply in the form of an aluminium foil.

It may, for example, be a foil of another metal or of another metal alloy.

Similarly, the metal-containing layer forming the second ply is not necessarily a metal foil.

The metal-containing layer may also be produced by deposition, spraying or coating over one of the faces of the first ply P1.

The metal-containing layer may also be a layer of material containing metal particles embedded therein, such as metal particles embedded in a curable resin or polymer material for example.

The composite sheet according to an embodiment of the invention may, for example, be produced in the form of a strip wound continuously as a roll, for example according to the following specifications:

Outer diameter of the "new" roll: around 80 mm.

Length of the wound strip of composite sheet: around 20 m.

Width of the roll: around 230 mm or around 300 mm.

Outer diameter of the mandrel on which the strip of sheet is wound: around 27 mm.

The strip of composite sheet wound as a roll may comprise perforations or "pre-cuts" along the cross direction in order to facilitate the delivery of the roll as individual sheets of predetermined length.

The composite sheet according to an embodiment of the invention may also be sold in the form of a packet of individual sheets, for example of substantially square shape, which may be stacked, or folded and/or interfolded, for example.

By way of non-limiting example and with reference to FIG. 2, one example of a process for producing a composite sheet CS according to an embodiment of the invention will now be described.

Figure 2:
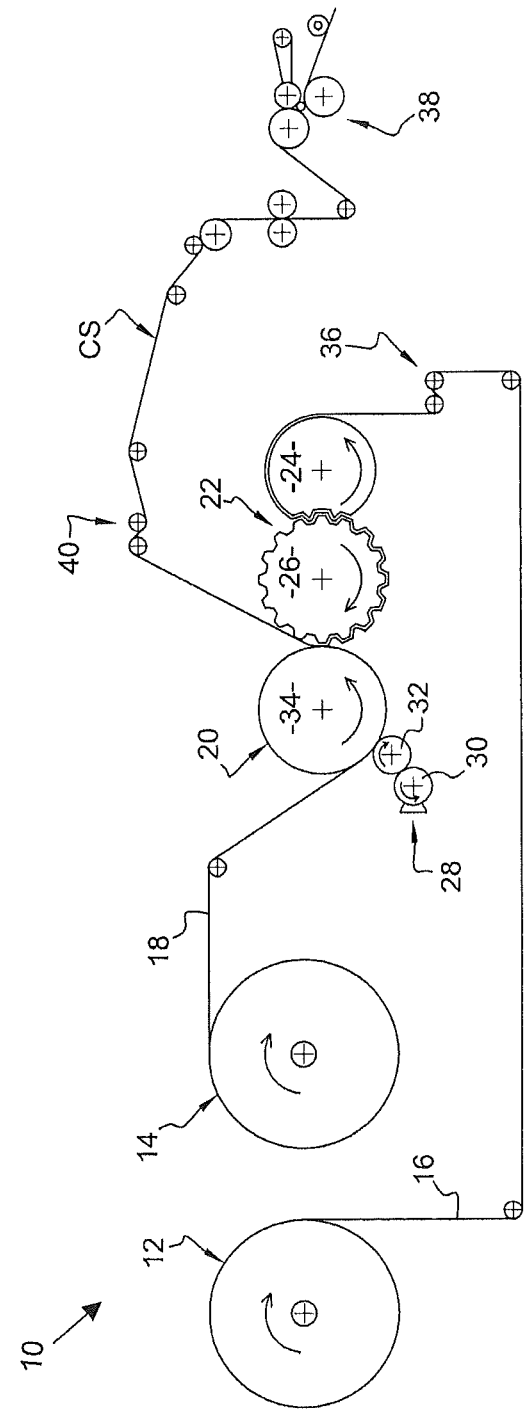
FIG. 2 is a diagram illustrating an example first installation for implementing a process according to an embodiment of the invention.

Represented in FIG. 2 is a first conversion line 10 composed of two motorized reels 12 and 14.

The first reel 12 is intended to receive the spool of cellulose wadding raw material 16, for example of TAD type. The cellulose wadding raw material 16 in this instance being the first ply P1 in accordance with an embodiment of the invention.

The second reel 14 receives the spool of aluminium foil 18. The foil 18 forms in this instance the second ply P2 in accordance with an embodiment of the invention.

The width of the spools may be defined as a function of customary dimensional standards.

Downstream of the reels 12 and 14, considering the running direction of the sheets from the reels, the conversion line 10 includes a unit 20 for bonding the two plies constituting the composite sheet CS according to an embodiment of the invention, and also a unit 22 for converting the sheet 16 in order to form the first ply P1 in accordance with an embodiment of the invention.

In a known manner, the unit 22 includes a rubber roll 24 and an engraved roll 26, the latter also constituting the marrying roll of the bonding unit 20.

After passing between the rolls 24 and 26, the embossed sheet 16 forms the first ply P1 in accordance with an embodiment of the invention.

The unit 20 for bonding the two plies P1 and P2 includes in this instance a bonding station 28 having a chambered doctor blade system 30 containing the adhesive ADH, and an applicator roll 32 for transfer of the adhesive to the opposite face of the second ply P2 (sheet 18).

The unit 20 also includes a combining roll 34 made of hard rubber.

During their passage between the combining rolls 26 and 34, the two plies P1 and P2 are joined together to form the composite sheet CS which is then continuously wound on a winding machine 38.

In order to absorb the possible disturbances linked to the differences in elongation between the two plies P1 and P2, an embodiment includes a draw-control group 36 arranged upstream of the roll 24.

The plies P1 and P2 joined together pass towards draw rolls 40 that enable homogeneous feeding, without a problem of folds, at the inlet of the winding machine 38.

Figure 3:
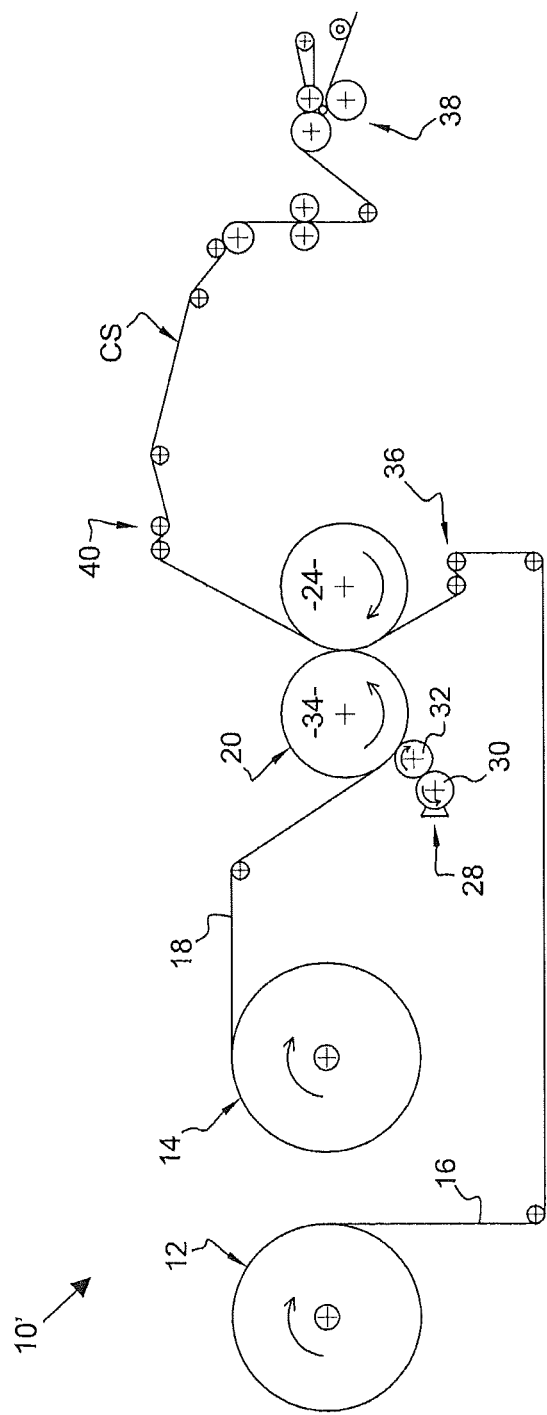
FIG. 3 is a diagram illustrating an example second installation for implementing a process according to an embodiment of the invention.

Represented in FIG. 3 is a second example conversion line 10'.

This line 10' will be described in comparison with the first line 10 illustrated in FIG. 2, the identical, analogous or similar components being denoted by the same reference numbers.

The composite sheet CS obtained due to this second line 10' is characterized in that the sheet 16 which forms the first ply P1 in accordance with an embodiment of the invention is not embossed.

For the purpose of the second line 10', the engraved roll 26 from the first line 10 is removed.

In order to be assembled, the sheets 16 and 18 thus pass between the combining roll 34 and the marrying roll 24 which is, in the instance of second conversion line 10', smooth. In an embodiment, the rolls 34 and 24 between which the two sheets are pressed are desirably made of steel.

Figure 4:
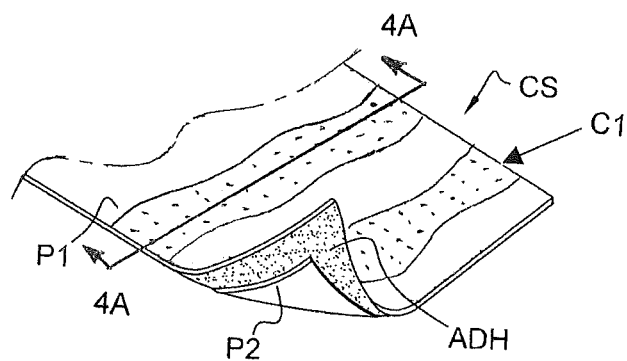
FIG. 4 is a schematic perspective view of a composite sheet according to an embodiment of the invention.
Figure 4A:
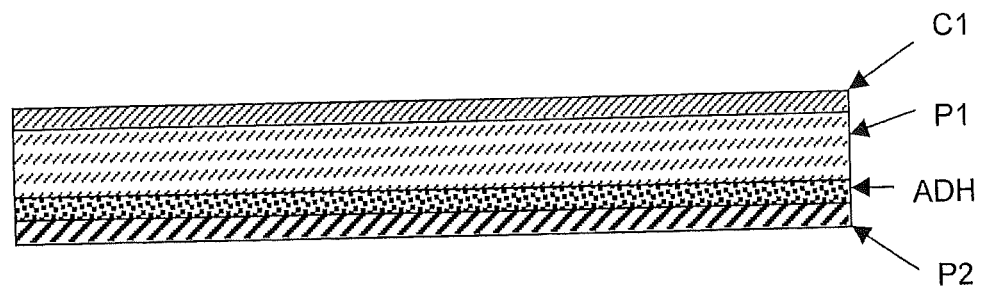
FIG. 4A is an expanded cross section view of the composite sheet of FIG. 4.

In an embodiment, and in addition to the foregoing, a non-stick coating C1 is applied to the outside surface of the first ply P1, as illustrated in FIGS. 4 and 4A, where FIG. 4A depicts an expanded cross section view of the composite sheet CS of FIG. 4 with coating C1 added. Coating C1 may be continuous or non-continuous.

If continuous, then coating C1 is porous, thereby allowing the passage of water vapor and/or condensed liquid into the cellulose structure of first ply P1. In an embodiment, coating C1 is a hydrophobic moisture-vapor-permeable coating formed using a hydrophobe precursor, such as: alkyl ketene dimers (AKD's) from Hercules, Inc.; alkenyl succinic anhydride (ASA) from American Cyanamid; and, Werner chromium complexes from du Pont, for example.

If non-continuous, then the material forming coating C1 is not necessarily porous, as long as there is sufficient exposure of the underlying first ply P1 to permit the passage of water vapor and/or condensed liquid into the cellulose structure of first ply P1. In an embodiment, coating C1 is a hydrophobic moisture-vapor-impermeable coating formed using: wax/polymer blends; polyethylene, polyvinylidene chloride; ethylene acrylic acid copolymer, polypropylene, polyester, poly lactic acid, polyisobutylene, nylon, polymethylpentene, ethylene vinyl acetate; hot melts; and, fluorinated molecules, for example. When used in accordance with an embodiment of the invention, the layer including coating C1 is considered to be permeable even though the material forming coating C1 may itself not be permeable, as the layer including coating C1 permits the passage of water vapor and/or condensed liquid into the cellulose structure of first ply P1.

While embodiments disclosed herein refer to specific materials useful for coating C1, it should be appreciated that the scope of the invention is not limited only to those materials listed, but may also include any hydrophobic moisture-vapor-permeable material, or any hydrophobic moisture-vapor-impermeable material, suitable for the purposes disclosed herein.

Figure 5:
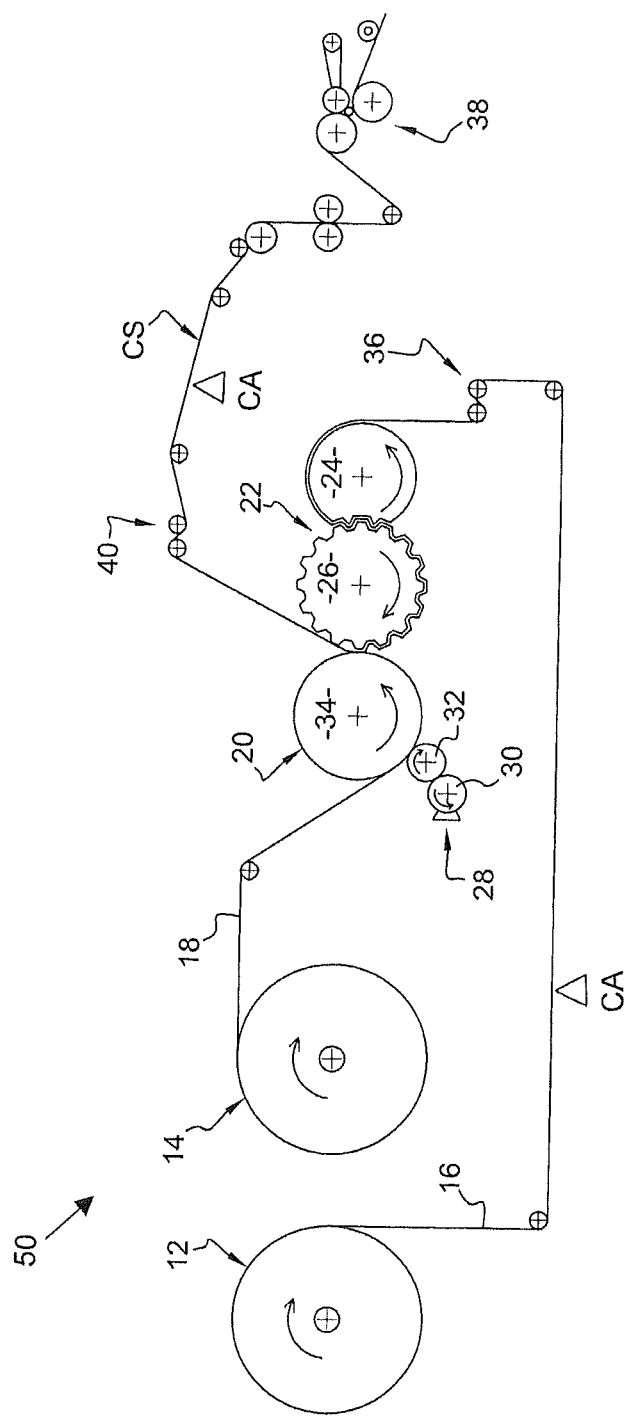
FIG. 5 is a diagram illustrating an example third installation for implementing a process according to an embodiment of the invention.
Figure 6:
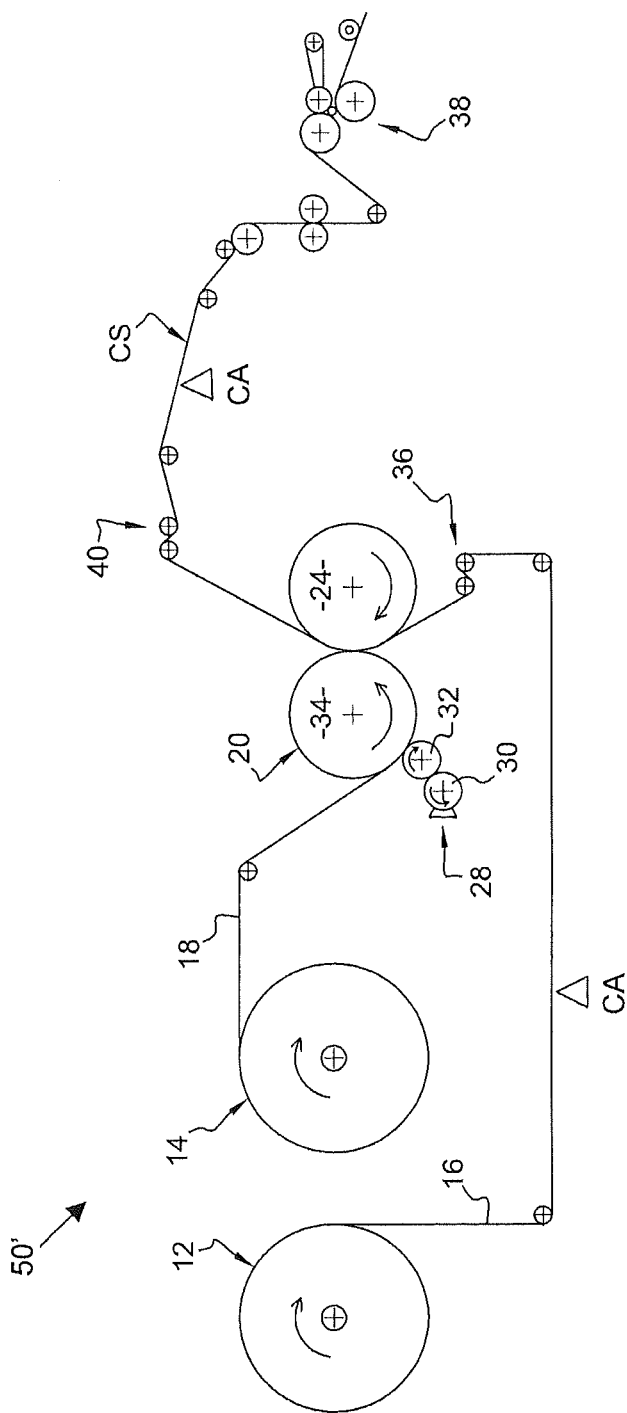
FIG. 6 is a diagram illustrating an example fourth installation for implementing a process according to an embodiment of the invention.

Reference is now made to FIGS. 5 and 6, which depict similar conversion lines to those of FIG. 2 (conversion line 10) and FIG. 3 (conversion line 10'). In FIGS. 5 and 6, the illustrated processes and associate equipment are referred to as third conversion line 50 and fourth conversion line 50', respectively.

In FIGS. 5 and 6, the coating C1 and the associated operations for applying the coating C1 are collectively referred to and designated by CA. While two locations are illustrated in each of FIGS. 5 and 6 for CA, only one location is needed to produce the composite sheet CS with the non-stick coating C1 in accordance with an embodiment of the invention. That is, coating C1 may be applied in one of two general locations, before the first and second plies P1 and P2 are combined (before marrying roll 24 for example), or after composite sheet CS is formed (after marrying roll 24 for example). Notwithstanding the foregoing, it will be appreciated that a two-stage application process for applying coating C1, both before and after marrying roll 24 for example, is not outside the scope of the claimed invention. The coating application CA could be accomplished inline during the lamination process, as illustrated in FIGS. 5 and 6, but could also be accomplished as a secondary offline operation. For example, the coating application CA could be accomplished as part of a post-lamination printing operation using rotogravure or anilox application methods, which would allow flexibility in the manufacturing process.

In addition to the foregoing, it will be appreciated that any of the above-noted functional chemistries may be added to the paper during the production of the paper (wet end or internal application), intermediate in the process (size press application), or post production (any of a variety of coating techniques applied after the paper sheet is formed, including in-line coating).

Additionally, the surface of the coated first ply P1 may be altered through oxidation by flame or corona discharge treatments, which will result in a higher surface energy and better ink adhesion if printing on the coated surface is desired. While embodiments of the invention are described employing certain techniques to alter the surface energy of the coated first ply, it will be appreciated that the scope of the invention is not limited to only those techniques mentioned, but also encompasses any other technique suitable for the purposes disclosed herein.

As discussed above, the release coating C1 may be applied in such a way that does not form a continuous barrier to the passage of water vapor, or to the passage of condensed liquid, into the cellulose structure of the first ply P1. As such, technologies that deposit discrete portions of coating C1 are desirable, although methods producing a continuous film may be used at low solids content.

From the foregoing, it will be appreciated that the release coating C1 can be applied by any suitable technique known to those skilled in the art, such as a size press or coater, spraying, powder coating, chemical vapor deposition, and physical vapor deposition. In general, any coating technique suitable for the purposes disclosed herein (for example, permitting conveyance of moisture to the absorptive parts of the first ply P1) may be used. Suitable coating methods known in the art and contemplated for use in accordance with an embodiment of the invention, are further described and discussed in U.S. Pat. No. 5,582,674.

In addition to the actual coating process, it is contemplated that additional operations such as drying may be employed. As such, reference herein to coating application CA also encompasses any additional operation employed in accordance with an embodiment of the invention.

While certain combinations of features have been described herein, it will be appreciated that these certain combinations are for illustration purposes only and that any combination of any of the disclosed features may be employed in accordance with an embodiment of the invention. Any and all such combinations are contemplated herein and are considered within the scope of the invention disclosed.

While certain locations for coating application CA have been described and illustrated herein, it will be appreciated that these certain locations are for illustration purposes only and that any location for coating application CA suitable for the purposes disclosed herein may be employed in accordance with an embodiment of the invention. Any and all such locations are contemplated herein and are considered within the scope of the invention disclosed.

As disclosed, some embodiments of the invention may include some of the following advantages: a composite paper wrap that could be used with the paper side in or the paper side out, depending on the particular type of food that is being wrapped, such as hot or cold food, or wet or dry food; a composite sheet wrap having a foil side that is capable of being smoothed out and reused; a composite sheet utilizing MG or MF paper that provides an improved printing surface over tissue paper; and, a composite sheet utilizing MG or MF paper having inorganic fillers for improved optical properties and lower cost.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. An absorbent composite sheet for domestic or away from home use, comprising:
   a first ply comprising paper and having with a degree of absorption of liquids at atmospheric pressure equal to or greater than about 5 (g/g CEN standard); and
   a second ply comprising a metal-containing layer superposed with the first ply, the thickness of the second ply being equal to or less than about 10 microns ($\mu$m).

2. The absorbent composite sheet according to claim 1, wherein the second ply is equal to or less than about 7 microns ($\mu$m).

3. The absorbent composite sheet according to claim 1, wherein and the basis weight (weight per unit area) of the second ply is between about 13 and about 19 grams per square meter (g/m²).

4. The absorbent composite sheet according to claim 1, wherein the basis weight (weight per unit area) of the composite sheet is equal to or greater than about 30 grams per square meter (g/m²) and equal to or less than about 69 grams per square meter (g/m²).

5. The absorbent composite sheet according to claim 1, wherein the metal-containing layer comprises an aluminum layer.

6. The absorbent composite sheet according to claim 1, wherein the second ply is a metal foil joined to the first ply by an adhesive.

7. The absorbent composite sheet according to claim 6, wherein the adhesive comprises a vinyl type adhesive.

8. The absorbent composite sheet according to claim 6, wherein the adhesive is deposited on one of the faces of the metal foil.

9. The absorbent composite sheet according to claim 1, wherein the first ply comprises at least one of: a tissue paper sheet; a machine gloss paper sheet; a machine glaze paper sheet; and a machine finish paper sheet.

10. The absorbent composite sheet according to claim 9, wherein the thickness of the first ply is equal to or greater than about 0.25 millimeters (mm) and equal to or less than about 0.45 millimeters (mm).

11. The absorbent composite sheet according to claim 9, wherein the basis weight (weight per unit area) of the first ply is equal to or greater than about 17 grams per square meter (g/m²) and equal to or less than about 50 grams per square meter (g/m²).

12. A roll composed of an absorbent composite sheet according to claim 9, formed from a continuously wound strip of the composite sheet.

13. The roll according to claim 12, wherein the strip of composite sheet wound as a roll comprises pre-cut regions.

14. A packet of individual absorbent composite sheets according to claim 9, composed of a stack of individual ones of the composite sheet, stacked up, folded, or interfolded.

15. The packet according to claim 14, further comprising a non-stick moisture-vapor-permeable coating disposed on an outer surface of the first ply.

16. A process for manufacturing the composite sheet according to claim 9 using a conversion line, the process comprising joining the first ply and the second ply by bonding and pressing together the first ply and the second ply between two rolls of the conversion line.

17. The process according to claim 16, wherein the composite sheet further comprises a non-stick moisture-vapor-permeable coating disposed on an outer surface of the first ply, the process further comprising applying the coating in at least one of: a location of the conversion line before the first ply and the second ply are bonded; and a location of the conversion line after the first ply and the second ply are bonded.

18. A roll composed of an absorbent composite sheet for domestic or away from home use, formed from a continuously wound strip of the composite sheet comprising:
a first ply comprising paper and having with a degree of absorption of liquids at atmospheric pressure equal to or greater than about 5 (g/g CEN standard) and having a non-stick moisture-vapor-permeable coating disposed on an outer surface of the first ply; and
a second ply comprising a metal-containing layer superposed with the first ply, the thickness of the second ply being equal to or less than about 10 microns (µm).

19. An absorbent composite sheet for domestic or away from home use, comprising:
a first ply comprising paper and having with a degree of absorption of liquids at atmospheric pressure equal to or greater than about 5 (g/g CEN standard) and having a non-stick moisture-vapor-permeable coating disposed on an outer surface of the first ply; and
a second ply comprising a metal-containing layer superposed with the first ply, the thickness of the second ply being equal to or less than about 10 microns (µm).

20. The absorbent composite sheet according to claim 19, wherein the coating is disposed in a non-continuous arrangement on the outer surface of the first ply.

* * * * *